(12) United States Patent
Nouet et al.

(10) Patent No.: US 6,764,209 B2
(45) Date of Patent: Jul. 20, 2004

(54) ROTATING HEADLIGHT FOR A MOTOR VEHICLE, HAVING A LAMP WITH TWO LIGHT SOURCES

(75) Inventors: Régis Nouet, Bobigny Cedex (FR); Philippe Hidden, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 26 days.

(21) Appl. No.: 10/021,909

(22) Filed: Dec. 17, 2001

(65) Prior Publication Data

US 2002/0109998 A1 Aug. 15, 2002

(30) Foreign Application Priority Data

Dec. 20, 2000 (FR) .............................................. 00 16647

(51) Int. Cl.[7] .................................................. B60Q 1/04
(52) U.S. Cl. ........................ 362/518; 362/215; 362/465; 362/539
(58) Field of Search ................................ 362/214, 465, 362/466, 517, 518, 526, 523, 539, 211, 213, 215

(56) References Cited

U.S. PATENT DOCUMENTS

| | | | |
|---|---|---|---|
| 4,663,696 A | 5/1987 | Miyazawa et al. ............ | 362/80 |
| 4,803,601 A | 2/1989 | Collot et al. ................... | 362/80 |
| 5,544,021 A | 8/1996 | Lopez et al. ................... | 362/61 |
| 5,711,590 A | 1/1998 | Gotoh et al. ................... | 362/43 |
| 5,954,428 A | 9/1999 | Eichhorn et al. ............ | 362/543 |
| 6,068,391 A | 5/2000 | Saladin et al. ............... | 362/516 |
| 6,309,094 B1 * | 10/2001 | Woerner ...................... | 362/539 |
| 6,565,246 B2 * | 5/2003 | Suzuki et al. ............... | 362/465 |
| 2001/0038535 A1 * | 11/2001 | Furuya et al. .............. | 362/469 |

FOREIGN PATENT DOCUMENTS

| | | |
|---|---|---|
| EP | 0 661 193 | 7/1995 |
| FR | 2 694 373 | 2/1994 |
| FR | 2 760 070 | 8/1998 |

OTHER PUBLICATIONS

French Search Report, Aug. 16, 2001.

* cited by examiner

*Primary Examiner*—Y. My Quach-Lee
(74) *Attorney, Agent, or Firm*—Morgan & Finnegan, LLP

(57) ABSTRACT

A motor vehicle headlight comprises a support, a lamp with two light sources, and a reflector with a first reflective surface and a second reflective surface. These surfaces reflect light from the lamp to give a first light beam and a second light beam. The first reflective surface is rotatable about an axis with respect to the support, in such a way as to direct the first beam towards the inside of the bend being followed by the vehicle.

25 Claims, 3 Drawing Sheets

ROTATING HEADLIGHT FOR A MOTOR VEHICLE, HAVING A LAMP WITH TWO LIGHT SOURCES

FIELD OF THE INVENTION

This invention relates to a motor vehicle headlight arranged to provide an additional lighting function.

BACKGROUND OF THE INVENTION

French patent specification FR 2 694 373 discloses a motor vehicle headlight which gives two different lighting functions, such as the fog penetrating function and the main beam headlight function. However, this type of light is fixed, and therefore only illuminates straight ahead, that is to say in the axis of the vehicle. This is effective so long as the vehicle is travelling in a straight line so that the headlights give effective lighting of the potential positions of the vehicle if it continues to travel in that straight path.

However, when the vehicle is following curved paths, for example when travelling round bends in the road, the fixed headlight is no longer able to illuminate perfectly, or even moderately well, the path ahead. One possible solution to this would be to provide a specific headlight which would increase the number of headlights to be fitted within the available space at the front of the vehicle. This space is however limited.

DISCUSSION OF THE INVENTION

An object of the invention is to provide a headlight which is capable of emitting a beam of light to illuminate the path ahead when the vehicle is following a non-straight path, without it being necessary to increase the surface area of the headlights.

According to a first aspect of the invention, a headlight for a vehicle, comprises a support, a lamp having first and second light sources, a first reflective surface and a second reflective surface, the said reflective surfaces being adapted to cooperate with the first and second light sources to emit first and second beams. At least the first reflective surface of the headlight is adapted to be displaced in rotation about an axis with respect to the support, whereby, when the vehicle is following a curved path defining a bend, the said first beam is adapted to be oriented towards the inside of the bend.

Thus, the path ahead is always illuminated by the headlight. The use of a lamp with two light sources enables two different lighting functions to be obtained in the same headlight, so that the overall optical surface area of the vehicle is not increased.

Preferably, the first reflective surface is in an upper part of the headlight.

Preferably, the second reflective surface is fixed with respect to the said first surface.

Preferably, the light is rotatable about the said axis.

Preferably, the said axis is arranged to extend vertically during operation of the headlight.

Preferably, the said first surface comprises a plurality of separate surface zones.

Preferably, the said surface zones are juxtaposed laterally to each other and are delimited by transition lines interrupting the slope in the curvature of the surface.

Preferably, the second surface is defined by a portion of a paraboloid having a focus situated close to the lamp and an axis substantially parallel to a main axis of the headlight.

Preferably, the first beam has a cut-off line.

Preferably, the said second beam corresponds to a main beam function of the headlight.

Preferably, it includes a shade or mask associated with the first surface for emitting the first beam in cooperation with the first light source of the lamp.

Preferably, the control unit is so arranged that the said rotation is a function of the amplitude through which a steering wheel of the vehicle is turned by a driver.

Preferably, the control unit is so arranged that the said rotation of the first surface is a function of vehicle speed.

Preferably, the control unit is so arranged that the illuminated or extinguished state of the first beam is a function of the amplitude through which a driver of the vehicle turns the steering wheel.

Preferably, the control unit is so arranged that the second beam is adapted to remain lit during the said rotation.

According to a third aspect of the invention, a vehicle has at least one headlight according to the above first aspect of the invention, or an assembly according to the said second aspect.

Further features and advantages of the invention will appear more clearly on a reading of the following detailed description of a preferred embodiment of the invention, which is given by way of non-limiting example only and with reference to the accompanying drawings.

DESCRIPTION OF A PREFERRED EMBODIMENT OF THE INVENTION

Figure 1:
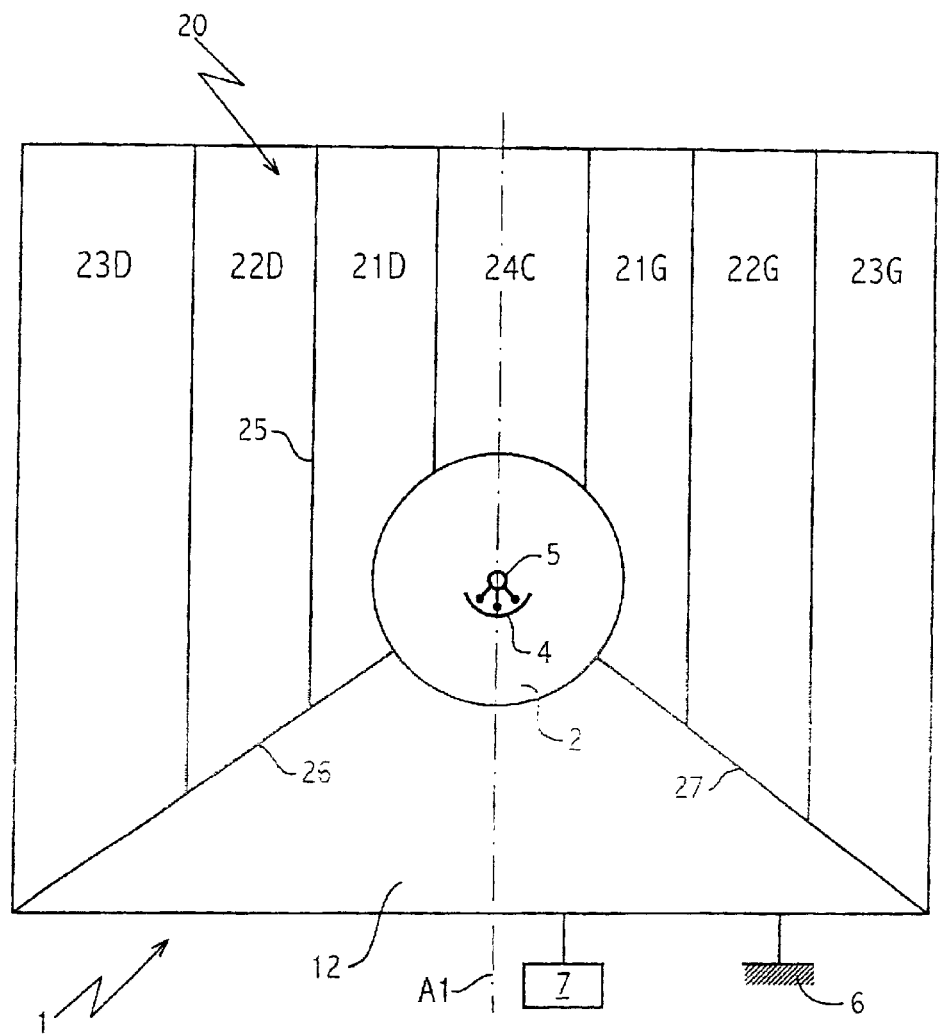
FIG. 1 is a diagrammatic front view of a headlight in the preferred embodiment of the invention.

With reference to FIG. 1, the headlight 1 comprises a support 6 carrying a reflector having two main reflective surfaces, namely a lower surface 12 and an upper surface 20. The headlight 1 also includes a lamp 2. The headlight 1 is controlled by a control unit 7, which is not part of the headlight but is connected to it.

The lamp 2 has a double light source 5 in the form of a pair of filaments, together with a shade or mask 4 for occulting and directing the radiation which passes to the lower part of the headlight, having been propagated from one of the two filaments of the double light source 5. For example, the lamp 2 may be, and preferably is, a lamp of the type commercially known as H4.

The lower surface 12 in this example is a surface in the form of a paraboloid of revolution, the focus of which is close to one of the two filaments 5, preferably the filament having its radiating portion, which is directed towards the lower part of the headlight, not occulted by the mask 4. The axis of revolution of the paraboloid is the main axis A2 of the headlight. The axis A2 is substantially horizontal. The surface 12 is dedicated to the main beam function of the headlight. The surface 12 meets the upper surface 20 along transition lines 26 and 27. The construction of such a reflector, which is of the so-called "complex surface" type, is described in detail in French patent specification No. 2 694 373, to which reference may be made for more particulars.

Figure 4:
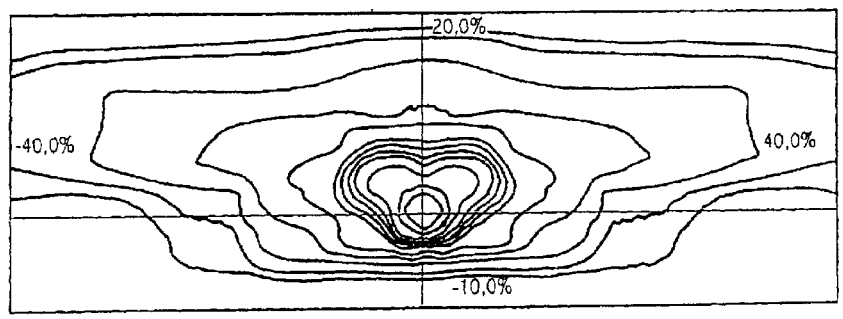
FIG. 4 is again a set of isolux curves, and shows the appearance of the beam produced by the second source in cooperation with the reflector of the headlight in FIG. 1.

Referring now to FIG. 4, this shows a set of isolux curves which show the optical behaviour of the lower surface 12 and the upper surface 20 of the headlight 1, both in cooperation with the second light source. As can be seen, the lower surface 12 can only be used in main beam mode. In this connection, it produces light above the horizon line which corresponds to the horizontal axis in the diagram of FIG. 4. And, in the known way, a dipped or passing beam, with a cut-off, is limited in its upper part by two half planes, one of which is coincident with the horizon line. This is as much true for a beam conforming to European regulations as those in the United States. Accordingly, it defines the limit above which no light radiation must be emitted in the passing beam function, which is used when vehicles are approaching each other in opposite directions.

Reference is once more made to FIG. 1 here. The surface 20 is mainly in the upper part of the headlight, extending from the transition lines 26 and 27. The surface 20 comprises a plurality of reflective surface zones 21D, 21G, 22D, 22G, 23D, 23G and 24C. These reflective surface zones are located in a symmetrical array on the reflector with respect to the vertical mid-plane of the headlight. These reflective surface zones are aligned vertically, and juxtaposed laterally to each other. They are delimited by transition lines 25, which interrupt the slope of the curvature of the surface of each zone. Details of the construction of the upper surface 20 are described in the text of French patent application published under the No. FR 2 760 067, to which reference may be made for more detail. This surface is arranged to cooperate with the other filament of the lamp 2.

Figure 2A:
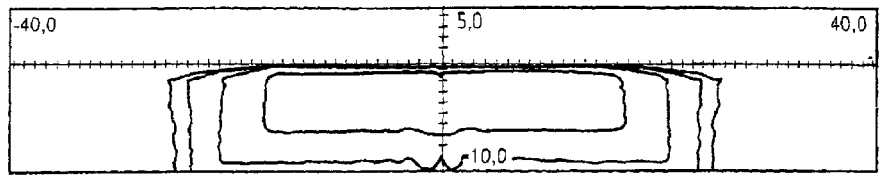
FIG. 2, which consists of FIGS. 2A, 2B, 2C and 2D, consists of a set of isolux curves on a projection screen showing the optical behaviour of various zones of the upper surface of the reflector, in the headlight of FIG. 1.
Figure 2B:
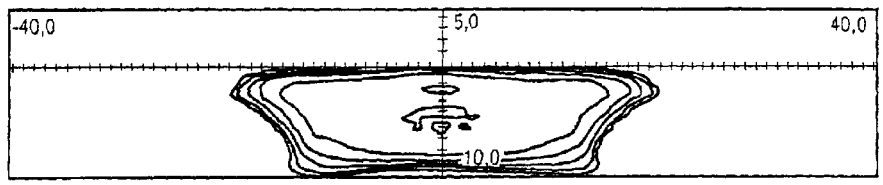
Figure 2C:
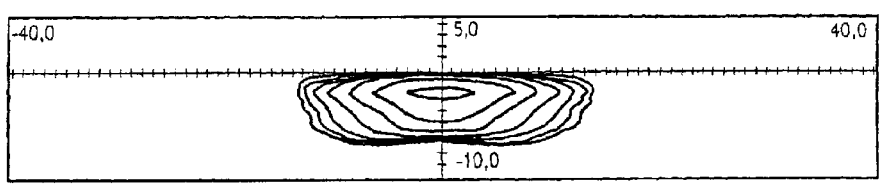
Figure 2D:
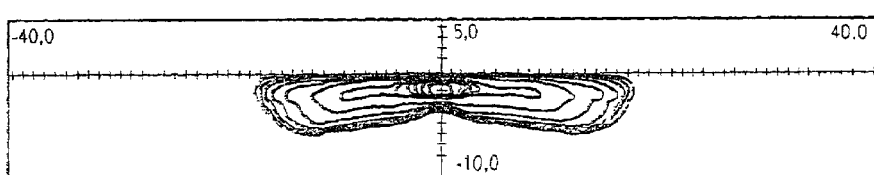

With reference now to FIG. 2A, the isolux curves in this Figure, on a projection screen, illustrate the optical behaviour of the central zone 24C in FIG. 1. The corresponding set of isolux curves in FIG. 2B shows the optical behaviour of the zones 21D and 21G; that of the zones 22D and 22G is shown in FIG. 2C; and finally, optical behaviour in the zones 23D and 23G is shown in FIG. 2D.

As can be seen from the four parts of FIG. 2, the upper surface 20 enables a horizontal cut-off line to be obtained, this line being indicated diagrammatically by the horizontal axis in each of these Figures, and being compatible with a projection of a light beam suitable for use as a passing beam. In this connection, various curves in FIG. 2 show that there is no emission of light beams above the horizontal cut-off line, which prevents dazzling of the occupants of vehicles travelling in the opposite direction.

Figure 3:
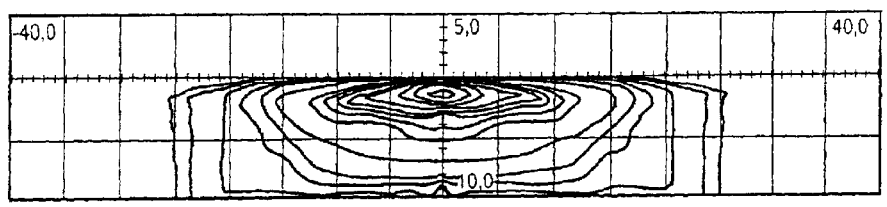
FIG. 3 consists of a set of isolux curves showing the appearance of the beam produced by the zones, acting together, in the upper surface of the reflector in the headlight of FIG. 1.

The isolux curves shown all together in FIG. 3 show the resulting overall optical behaviour of the upper surface 20.

In summary, the turning function, for use when the vehicle is following a non-straight path such as a bend in the road, is obtained by cooperation of the first light source with the upper surface 20, while the main beam function is obtained by cooperation of the second light source with, mainly, the lower surface 12.

Figure 5:
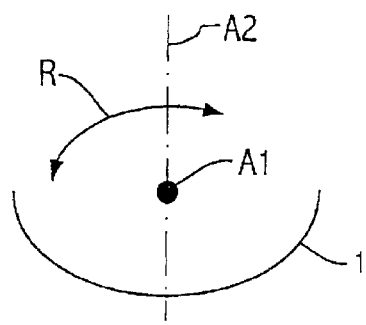
FIG. 5 is a diagrammatic top plan view of the headlight of FIG. 1.

In use, the headlight 1 is adapted to be rotatable as a unit (in particular the reflector and lamp) about a vertical axis A1, as is shown diagrammatically in FIG. 5. Preferably, the axis A1 is contained in the vertical mid-plane of the headlight 1, and is at right angles to the axis A2. Rotation R of the headlight about the axis A1 is a function of two parameters. The first of these parameters is the curvature of the path followed by the vehicle. The magnitude of this curvature can be measured from the angle through which the steering wheel is turned in order to follow this path. The second of the above mentioned parameters is the speed of the vehicle which will enable the magnitude of the rotation R of the headlight to be modified.

It is also possible to take other parameters into account. Among these, if the vehicle is equipped with a global positioning system, information issued by the global positioning system can be used to determine the magnitude of the rotation appropriate for the headlight 1.

The control member 7 controls the rotation of the headlight 1 described above. The unit 7 includes means for rotating the headlight, which may be of various types, for example a motorised gearbox unit or a servomotor governed electronically and/or by a computer as a function of the foregoing parameters. The means for rotating the headlight are in any case of a sufficiently well known type to be able to be chosen without any difficulty by a competent person working in this technical field.

Figure 6:
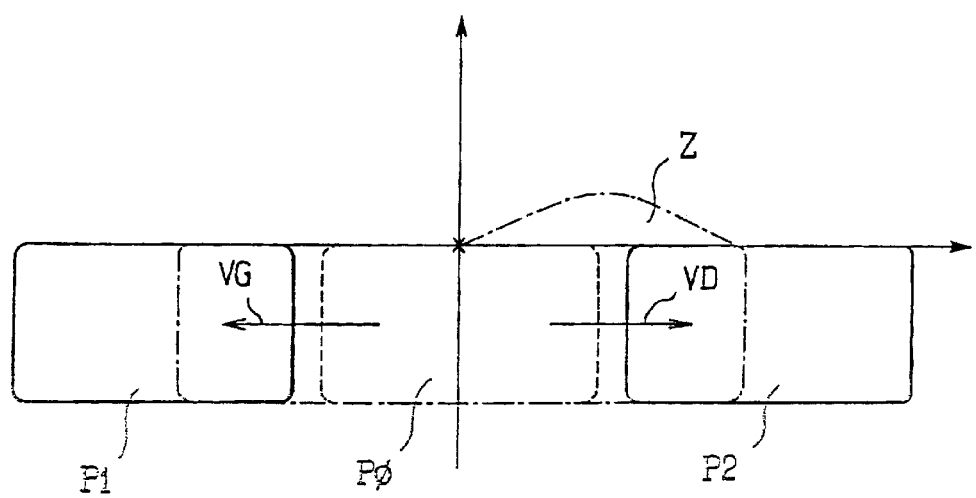
FIG. 6 is a diagrammatic representation of various zones illuminated by a headlight according to the invention.

Reference is now made to FIG. 6, showing various beam configurations, among which are some beams produced by the headlight just described. Thus, a passing beam with a cut-off of the European type, illuminating a zone Z, is shown. In addition, the cut-off line is defined on the left by a horizontal half plane extending on the horizon line, and on the right by an inclined half plane which is raised upwards from the optical axis, for driving on the right hand side. When the vehicle is travelling in a straight line, the headlight produces the main beam shown in FIG. 4 by means of the reflector and the second filament of the lamp working together, the other filament being extinguished. However, it can optionally be arranged that this other filament is in fact energised, thereby producing a supplementary beam PO shown in FIGS. 3 and 6 and included in the zone Z.

During driving on a left hand bend, or at the beginning of a left hand bend, the main beam is retained, while under the action of the control unit 7, the filament associated with the upper zone 20 is energised, thereby producing the beam of FIG. 3. At the same time, the reflector pivots with respect to the vehicle about the axis A1 towards the left in the direction of the bend in the road, so as to illuminate the bend in a zone P1 which is offset to the left with respect to the optical axis of the headlight. At the end of the bend, the headlight pivots to the right so as to regain its original position, and the filament associated with the upper zone 20 is extinguished, the main beam only remaining it under the action of a control unit 7. Operation is similar in the case of a right hand bend, which is illuminated in a zone P2.

The arrangements described above are in practice applicable to each of the two headlights of the vehicle, so that both its headlights can be used to greatest effect both straight ahead and on bends.

In addition, the vehicle has two other road lights, or two sub-assemblies integrated in the headlights already described. These two further lights are adapted to produce a fixed passing beam. The straight/bend headlight of the invention complements the fixed passing beam in a zone in which the latter is inactive. Thus, when travelling around a right hand bend VD (FIG. 6), the bend function is activated to illuminate the zone P2 of the bend outside the zone Z. Similarly, on a left hand bend VG, the bend function illuminates the zone P1 outside the zone Z in which the fixed passing beam light gives illumination.

Moreover, the headlight is so arranged that the energised (lit) or extinguished state of the light source 5 situated above the mask 4, which is solely responsible for the bend function achieved in cooperation with the upper surface 20, depends on the amount of rotation of the steering wheel by the driver.

In addition, the second light source is arranged to remain lit during rotation of the headlight 1 about the axis A1 when the main beam function is activated.

It will be very clear that many modifications to the invention may be applied to it without by so doing departing from the scope of the invention. The following may for example be considered as options:

- only the upper surface 20 (and not the lower surface 12) of the headlight 1 may be made to turn about the axis A1 to achieve the rotation R;
- the upper surface of the reflector, or the whole headlight (apart from the lamp or other light source) may be able to turn with respect to the light source or sources;
- the lower surface may be a complex surface without any curvature;
- the headlight may regain its original position to emit the main beam in every case;
- the or each light source may be fixed with respect to the upper surface of the headlight; and
- the H4 type lamp may be replaced by any type whatever of halogen light having two sources, or again by a lamp with two arcs.

What is claimed is:

1. A vehicle headlight comprising: a support; a lamp carried by said support, the lamp comprising a first light source and a second light source; a first reflective surface carried by the support; and a second reflective surface carried by the support, said reflective surfaces being adapted to cooperate with said first and second light sources to produce first and second light beams, the headlight defining an axis of rotation, at least said first reflective surface being adapted to be coupled to control means for rotating at least said first reflective surface about said axis of rotation with respect to said support, whereby, when said vehicle is describing a curved path defining a bend, said first light beam is oriented towards the inside of the bend;
the vehicle headlight further comprising an upper part, wherein said first reflective surface is in the upper part.

2. The headlight according to claim 1, wherein the said second reflective surface is fixed with respect to the first surface.

3. The headlight according to claim 2, wherein said axis of rotation is oriented vertically during operation of the headlight.

4. The headlight according to claim 1, wherein said first reflective surface comprises a plurality of seperate zones.

5. The headlight according to claim 4, wherein said zones are juxtaposed laterally to each other and the first reflective surface defines transition lines delimiting said zones, each zone having a curvature, the transition lines interrupting the curvature of said zones.

6. The headlight according to claim 1, further comprising means for defining a cut-off line in said first light beam.

7. The headlight according to claim 1, wherein said second light beam provides a main beam illumination function.

8. A vehicle headlight comprising: a support; a lamp carried by said support, the lamp comprising a first light source and a second light source; a first reflective surface carried by the support; and a second reflective surface carried by the support, said reflective surfaces being adapted to cooperate with said first and second light sources to produce first and second light beams, the headlight defining an axis of rotation, at least said first reflective surface being adapted to be coupled to control means for rotating at least said first reflective surface about said axis of rotation with respect to said support, whereby, when said vehicle is describing a curved path defining a bend, said first light beam is oriented towards the inside of the bend;
the vehicle headlight further comprising a substantially horizontal main axis, wherein said second reflective surface is defined by a portion of a paraboloid having a focus close to said first and second light sources and an axis substantially parallel to said main axis.

9. The headlight according to claim 8, wherein said second reflective surface is fixed with respect to the first surface.

10. The headlight according to claim 9, wherein said axis of rotation is oriented vertically during operation of the headlight.

11. The headlight according to claim 8, wherein said first reflective surface comprises a plurality of seperate zones.

12. The headlight according to claim 11, wherein said zones are juxtaposed laterally to each other and the first reflective surface defines transition lines delimiting said zones, each zone having a curvature, the transition lines interrupting the curvature of said zones.

13. The headlight according to claim 8, further comprising means for defining a cut-off line in said first light beam.

14. The headlight according to claim 8, wherein said second light beam provides a main beam illumination function.

15. A vehicle headlight comprising: a support; a lamp carried by said support, the lamp comprising a first light source and a second light source; a first reflective carried by the support; and a second reflective surface carried by the support, said reflective surfaces being adapted to cooperate with said first and second light sources to produce first and second light beams, the headlight defining an axis of rotation, at least said first reflective surface being adapted to be coupled to control means for rotating at least said first reflective surface about said axis of rotation with respect to said support, whereby, when said vehicle is describing a curved path defining a bend, said first light beam is oriented towards the inside of the bend;
the vehicle headlight further including a shade for occulting radiation from said lamp to the second reflective surface.

16. The headlight according to claim 15, wherein said second reflective surface is fixed with respect to the first surface.

17. The headlight according to claim 16, wherein said axis of rotation is oriented vertically during operation of the headlight.

18. The headlight according to claim 15, wherein said first reflective surface comprises a plurality of seperate zones.

19. The headlight according to claim 18, wherein said zones are juxtaposed laterally to each other and the first reflective surface defines transition lines delimiting said zones, each zone having a curvature, the transition lines interrupting the curvature of said zones.

20. The headlight according to claim 15, further comprising means for defining a cut-off line in said first light beam.

21. The headlight according to claim 15, wherein said second light beam provides a main beam illumination function.

22. An assembly for a vehicle having a steering wheel, comprising:
- a headlight including a support, a lamp carried by said support, the lamp having a first light source and a second light source, a first reflective surface carried by the support, and a second reflective surface carried by the support, said reflective surfaces being adapted to cooperate with said first and second light sources to produce first and second light beams, the headlight defining an axis of rotation; and
- a control unit coupled to the headlight for rotating at least said first reflective surface;
- wherein the control unit is arranged to control the state of illumination or extinction of said first light beam as a function of the amplitude through which the steering wheel is turned by a driver of the vehicle.

23. The assembly according to claim 22, the control unit being linked to the steering wheel whereby the control unit rotates at least said first reflective surface by an amount dependant on the amplitude through which the steering wheel is turned by a driver of the vehicle.

24. The assembly according to claim 22, wherein the control unit is adapted to effect said rotation of at least the first reflective surface by an amount dependant on the travelling speed of the vehicle.

25. The assembly according to claim 22, wherein the control unit is adapted to keep said second light beam lit during said rotation.

* * * * *

UNITED STATES PATENT AND TRADEMARK OFFICE
CERTIFICATE OF CORRECTION

PATENT NO.    : 6,764,209 B2
DATED         : July 20, 2004
INVENTOR(S)   : Nouet et al.

It is certified that error appears in the above-identified patent and that said Letters Patent is hereby corrected as shown below:

Column 5,
Line 50, "wherein the said" should read, -- wherein said --;
Line 57, "seperate" should read, -- separate --;

Column 6,
Lines 26 and 60, "seperate" should read, -- separate --;
Line 39, "a first reflective carried" should read, -- a first reflective surface carried --;

Column 8,
Lines 6 and 11, "dependant" should read, -- dependent --.

Signed and Sealed this

Fifteenth Day of February, 2005

JON W. DUDAS
*Director of the United States Patent and Trademark Office*